(12) United States Patent
Maier et al.

(10) Patent No.: US 9,707,931 B2
(45) Date of Patent: Jul. 18, 2017

(54) WINDSHIELD WIPER DEVICE

(75) Inventors: Gerald Maier, Ottersweier-Unzhurst (DE); Norbert Wegner, Buehl (DE); Juergen Rapp, Lauf (DE); Michael May, Offenburg (DE)

(73) Assignee: Robert Bosch GmbH, Stuttgart (DE)

( * ) Notice: Subject to any disclaimer, the term of this patent is extended or adjusted under 35 U.S.C. 154(b) by 1102 days.

(21) Appl. No.: 13/391,406

(22) PCT Filed: Jul. 8, 2010

(86) PCT No.: PCT/EP2010/059777
§ 371 (c)(1),
(2), (4) Date: May 10, 2012

(87) PCT Pub. No.: WO2011/020649
PCT Pub. Date: Feb. 24, 2011

(65) Prior Publication Data
US 2012/0227205 A1   Sep. 13, 2012

(30) Foreign Application Priority Data

Aug. 19, 2009  (DE) .................. 10 2009 037 922
Nov. 25, 2009  (DE) .................. 10 2009 045 183

(51) Int. Cl.
*H02P 6/16* (2016.01)
*B60S 1/08* (2006.01)
*B60S 1/24* (2006.01)

(52) U.S. Cl.
CPC .. *B60S 1/08* (2013.01); *B60S 1/24* (2013.01)

(58) Field of Classification Search
CPC .. H02P 21/06; H02P 27/08; H02P 6/08; H02P 2205/05; H02P 3/08; H02P 23/005; H02P 7/29; H02P 6/085; H02P 6/14; H02P 1/04; H02P 7/53873; H02P 6/06; H02P 2240/423; B60S 1/482; B60S 1/583; B60S 1/0896; B60S 1/08; B60S 1/0818; B60S 1/0807
USPC ........ 318/11, 163, 595, 434, 43, 444, 400.3, 318/467, 468, 282, 285, 293, 806, 831, 318/257, 400.07, 400.12, 400.16, 715, 318/721, 779

See application file for complete search history.

(56) References Cited

U.S. PATENT DOCUMENTS

| 4,663,575 | A | * | 5/1987 | Juzswik et al. | ............... 318/444 |
| 5,526,460 | A | * | 6/1996 | DeFrancesco et al. | ....... 388/831 |
| 7,166,979 | B2 |  | 1/2007 | Zimmer | |

(Continued)

FOREIGN PATENT DOCUMENTS

| CN | 2774001 | | 4/2006 |
| DE | 4330112 | A1 * | 3/1995 |
| WO | 2008138663 | | 11/2008 |

OTHER PUBLICATIONS

PCT/EP2010/059777 International Search Report dated Aug. 5, 2010 (Translation and Original, 4 pages).

*Primary Examiner* — Jorge L Carrasquillo
(74) *Attorney, Agent, or Firm* — Michael Best & Friedrich LLP

(57) ABSTRACT

The invention relates to a windshield wiper device (100) comprising a driving means (110) and a control unit (130) for the driving means (110). An operating characteristic map (140) is provided, in which a maximum torque to be output by the driving means (110) and a minimum rotational speed of the driving means (110) are stored.

15 Claims, 4 Drawing Sheets

(56) References Cited

U.S. PATENT DOCUMENTS

| | | | |
|---|---|---|---|
| 2003/0128004 A1* | 7/2003 | Bilcke | 318/432 |
| 2004/0145331 A1* | 7/2004 | Gloaguen et al. | 318/443 |
| 2008/0272725 A1* | 11/2008 | Bojrup et al. | 318/434 |
| 2009/0282636 A1* | 11/2009 | Braun et al. | 15/250.12 |
| 2010/0192907 A1* | 8/2010 | Stemler et al. | 123/350 |

* cited by examiner

WINDSHIELD WIPER DEVICE

BACKGROUND OF THE INVENTION

The invention relates to a windshield wiper device and to a method for operating a windshield wiper device.

Numerous methods for controlling windshield wiper devices are known. DE 101 44 985 A1 describes a method for controlling a windshield device by means of a driving device and a transmission with a transmission ratio which is dependent on the position of the transmission, in which method the torque output by the driving device via a drive shaft is ascertained at each moment taking the transmission ratio into consideration. The maximum output torque here roughly follows a maximum required torque. The output torque is reduced by limiting an electric current. It is also known to limit the torque output by the driving device for certain positions of the windshield wiper device by reducing the supply voltage. The applicability of this method is limited by the fact that the supply voltage can be reduced only to around 50% of the maximum value thereof, and a reduction in the supply voltage also involves a reduced rotational speed and therefore reduced dynamics of the driving device. Simpler methods also exist, in which the speed of the driving device is reduced in the region of the reversal position.

SUMMARY OF THE INVENTION

It is the object of the present invention to provide an improved windshield wiper device. Furthermore, it is an object of the present invention to specify an improved method for operating a windshield wiper device.

A windshield wiper device according to the invention has a driving means and a control unit for the driving means. In this case, an operating map is provided, in which a maximum torque to be output by the driving means and a minimum rotational speed of the driving means are stored. The control unit can then advantageously monitor observance of the torque to be output at maximum and of the minimum rotational speed of the driving means and, if the torque to be output at maximum is exceeded, can suitably react, for example by immediately switching the windshield wiper device off or by changing the direction of rotation of the driving means. This advantageously avoids undesired operating and loading states. When crank mechanisms are used, infinitely high forces which are theoretically possible can no longer occur because of the toggle lever effect. As a result, the mechanical loading of rods, bearings, crank plates, fastening points and other mechanical components of the windshield wiper device drops. As a consequence, this permits the use of thinner wall thicknesses, shorter bearings, smaller rotary joints and alternative, lower-strength materials. This enables a saving in weight, construction space and costs to a high extent. This permits the use of the windshield wiper device according to the invention even in confined and divided motor vehicle environments. By means of the reduced weight, the average current consumption of the windshield wiper device also drops, which makes a direct contribution to reducing the emission output of the motor vehicle.

A maximum torque to be output by the driving means and a minimum rotational speed of the driving means are preferably in each case stored in the operating map for different angular positions of a shaft of the driving means. This advantageously enables different torques and rotational speeds required in different positions of the windshield wiper device to be taken into consideration.

In a development, a further torque limit value is in each case additionally stored in the operating map for different angular positions of a shaft of the driving means. In the event of the maximum torque being exceeded, the control unit can then advantageously attempt to reduce the torque by reducing the rotational speed, and can completely switch the driving means off only if the second torque limit value is exceeded.

In a development of the windshield wiper device, a transmission which transmits a movement of the driving means to a wiper shaft is arranged downstream of the driving means, the transmission having a transmission ratio which depends on the angular position of the shaft of the driving means. The operating map can advantageously take the angular dependency of the transmission ratio into consideration.

Expediently, the driving means can be activated by a pulse-width-modulated voltage signal, and the control unit is designed to regulate a pulse-duty factor of the pulse-width-modulated voltage signal in such a manner that a minimum rotational speed of the driving means is set, which minimum rotational speed is stored in the operating map, and a torque output by the driving means does not exceed a maximum torque stored in the operating map. It is advantageously possible as a result to ensure that the windshield wiper device is operated only within a permitted range of parameters.

A device is preferably provided for ascertaining a rotational speed of the driving means. In this case, the control unit is designed to determine the torque output by the driving means on the basis of the rotational speed of the driving means and of the pulse-duty factor of the pulse-width-modulated voltage signal. This advantageously enables windshield wiper device faults to be identified.

The control unit is particularly preferably designed to switch the driving means off or to reverse a driving direction of the driving means if the torque output by the driving means exceeds the maximum torque provided in the operating map. Damage to the windshield wiper device can advantageously be prevented as a result.

A method according to the invention for operating a windshield wiper device, with a driving means and a control unit for the driving means, has method steps for determining a maximum torque to be output by the driving means, for determining a desired rotational speed of the driving means, and for regulating a pulse-duty factor of a pulse-width-modulated voltage signal for activating the driving means, in such a manner that the desired rotational speed of the driving means is set and an actual torque output by the driving means does not exceed the maximum torque. The method advantageously then permits monitoring of the torque to be output at maximum. In the event of the torque to be output at maximum being exceeded, there can be a suitable reaction. As a result, undesired operating and load states are avoided, which reduces the mechanical loading of rods, bearings, crank plates, fastening points and other mechanical components of the windshield wiper device. This enables the use of thinner wall thicknesses, shorter bearings, smaller rotary joints and alternative, lower-strength materials, thus in turn enabling a saving on weight, construction space and costs.

In an expedient configuration of the method, it is determined if the pulse-duty factor cannot be adjusted in such a manner that the desired rotational speed of the driving means is set and the actual torque output by the driving means does not exceed the maximum torque, the pulse-duty factor being adjusted in this case in such a manner that a lower rotational speed is set. By this means, the characteristic curve of the driving means is advantageously modified in such a manner that the torque output by the driving means does not exceed the maximum predetermined torque.

The maximum torque to be output by the driving means and/or the desired rotational speed of the driving means are/is preferably determined depending on an angular position of a shaft of the driving means. As a result, different torques required in different positions of the windshield wiper device, and a possible angular dependency of a transmission ratio of a transmission can advantageously be taken into consideration.

The maximum torque to be output by the driving means and/or the desired rotational speed of the driving means are/is preferably deduced from an operating map. All of the desired operating situations of the windshield wiper device can then advantageously be defined in said operating map.

BRIEF DESCRIPTION OF THE DRAWINGS

The invention is now explained in more detail with reference to the attached figures, in which the same reference numbers are used for identical or identically acting elements. In the figures.

DETAILED DESCRIPTION

Figure 1:
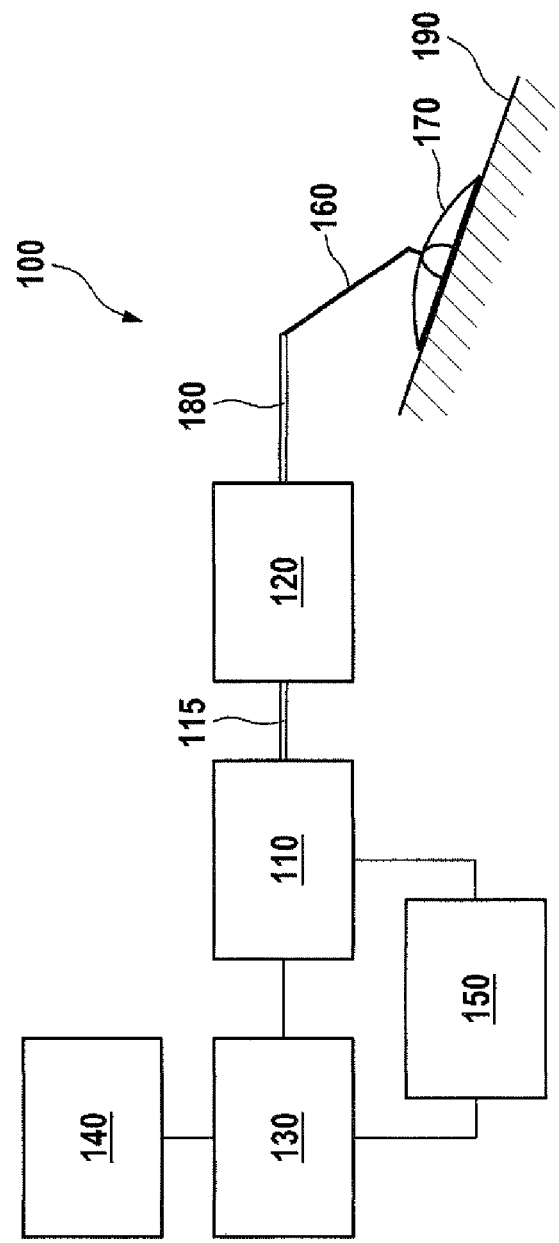
FIG. 1 shows a schematic block circuit diagram of a windshield wiper device.

FIG. 1 shows a windshield wiper device 100 in a schematized illustration. The windshield wiper device 100 has a wiper arm 160 to which a wiper blade 170, which serves to wipe a window 190, is fastened. The window 190 may be, for example, a motor vehicle window. The wiper arm 160 can be set into a pivoting movement via a wiper shaft 180. For this purpose, a driving means 110 brings a drive shaft 115 into a rotational movement which is transmitted to the wiper shaft 180 via a transmission 120. The driving means 110 may be an electric motor, for example a reversing electric motor. The transmission 120 may be, for example, a crank mechanism. In this case, the transmission 120 has a transmission ratio which depends on an angular position of the drive shaft 115. In addition, the transmission 120 and the wiper arm 160 have an elasticity which can likewise depend on the angular position of the drive shaft 115.

The driving means 110 is activated by a pulse-width-modulated voltage signal. In this case, the pulse-duty factor of the pulse-width-modulated voltage signal determines an effective voltage value and thereby ascertains the angular speed at which the driving means 110 drives the drive shaft 115. The driving means 110 is activated by a control unit 130. The control unit 130 can be designed, for example, as a microcontroller or microcomputer. The control unit 130 may also be integrated with another control unit of a motor vehicle. The control unit 130 has access to an operating map 140. The operating map 140 may be designed, for example, as a table of values in a non-volatile data memory. The operating map 140 may also be integrated in the control unit 130. In addition, the control unit 130 is connected to a tachometer 150 which is designed to determine a number of revolutions or a rotational speed of the driving means 110 or of the drive shaft 115. The tachometer 150 may also be designed as a position sensor which determines a change in position of the drive shaft 115.

A maximum torque to be output by the driving means 110 is stored in the operating map 140. The maximum torque to be output by the driving means 110 is preferably stored in the operating map 140 in dependence on an angular position of the driving means 110 or of the drive shaft 115. The control unit 130 activates the driving means 110 in such a manner that the maximum torque stored in the operating map 140 is not exceeded. If an operating situation occurs, in which the torque output by the driving means 110 would exceed the maximum torque provided in the operating map 140, the control unit 130 can react thereto in the determined form. For example, the control unit 130 can switch the driving means 110 off or reverse a direction of rotation of the driving means 110.

The operating map 140 can also supply two torque limit values for each angular position of the driving means 110 or of the drive shaft 115. If the first torque limit value is exceeded, the control unit 130 attempts to reduce the output torque. If, nevertheless, the second limit value is also exceeded, the control unit 130 switches the driving means 110 off. It is explained below how the torque limit values stored in the operating map 140 can be determined.

The operating map 140 can also supply a desired rotational speed of the driving means 110 for each angular position of the driving means 110 or of the drive shaft 115. The desired rotational speed may be identical for all angular positions of the driving means 110 or of the drive shaft 115 or may depend on the angular positions of the driving means 110 or of the drive shaft 115. The control unit 130 then activates the driving means 110 in such a manner that the particular desired rotational speed is set.

Figure 2:
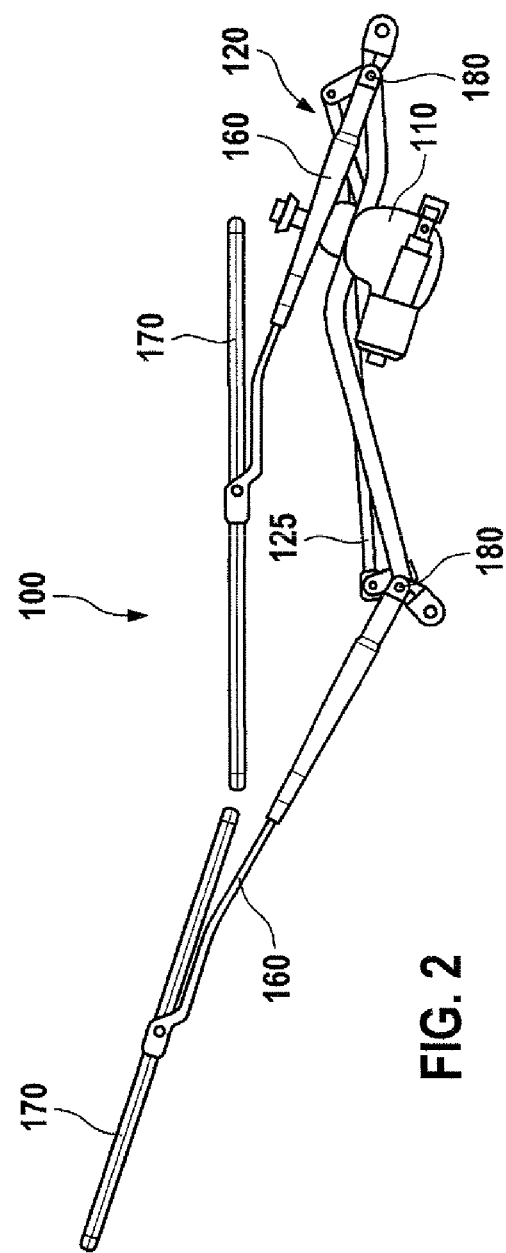
FIG. 2 shows a further view of the windshield wiper device.

FIG. 2 shows a further exemplary view of the windshield wiper device 100. In particular, FIG. 2 shows that the transmission 120 has a transmission rod 125.

Figure 3:
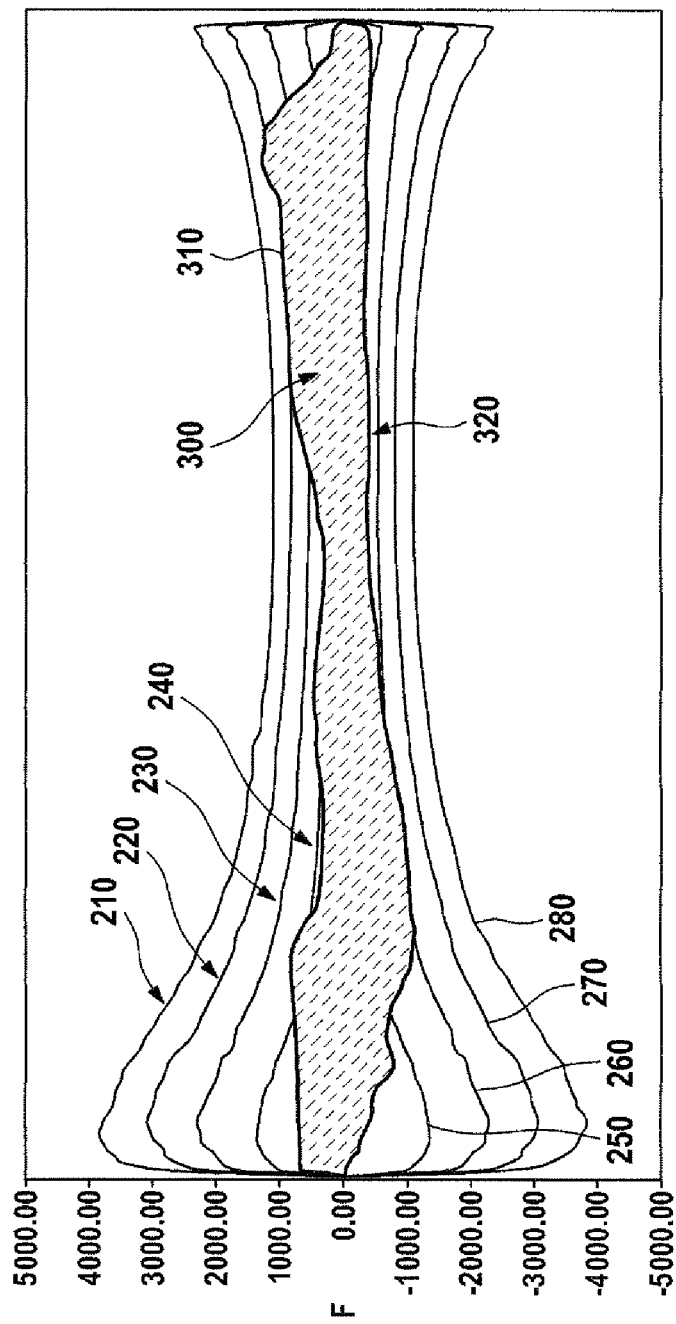
FIG. 3 shows an operating map of a windshield wiper device.

FIG. 3 shows, in a schematic illustration, a relationship between a rotational angle a of the driving means 110 or of the drive shaft 115 and a force F exerted by the articulated rod 125 of the transmission 120. The force F exerted by the articulated rod 125 of the transmission 120 is dependent on the angle a of the driving means 110 or of the drive shaft 115 because of the angular dependency of the transmission ratio of the transmission 120. In FIG. 3, the angle a of the drive shaft 115 is plotted on the horizontal axis, and the rod force F of the articulated rod 125 of the transmission 120 is plotted on the vertical axis. A first rod force profile 210 shows the force F exerted by the articulated rod 125 of the transmission 120 for the situation in which the driving means 110 outputs a constant first torque, for example 40 Nm. A second rod force profile 220, a third rod force profile 230, a fourth rod force profile 240, a fifth rod force profile 250, a sixth rod force profile 260, a seventh rod force profile 270 and an eighth rod force profile 280 show the profile of the rod force F, which profile is dependent on the angle a of the drive shaft 115, for other constant values of the torque output by the driving means 110. For example, the second rod force profile 220 can correspond to a torque of 30 Nm, the third rod force profile 230 can correspond to a torque of 20 Nm, and the fourth rod force profile can correspond to a torque of 10 Nm. In all cases, the profile of the rod force F is dependent on the angle a of the drive shaft 115 because of the angular dependency of the transmission ratio of the transmission 120.

In order to produce the table of values stored in the operating map 140, the desired operating situations at the window 190 of the motor vehicle are defined in a first step. These include, for example, the operating moments on wiper bearings of the windshield wiper device 100, which operating moments are required in order to operate the wiper arm 160 and the wiper blade 170 at the desired speeds and accelerations at every position and every angle of the wiping movement of the wiper arm 160 during the wind loads occurring at the maximum driving speed of the motor vehicle. In addition, it is possible to determine the desired forces or changes in force which are to be exerted if the wiper blade 170 strikes against an obstacle, for example a wedge of snow, or the wiper blade 170 is frozen to the window 190.

The operating map obtained in this manner at the window 190 can be converted, in a second step, by suitable calculating methods into an operating map 300 of the transmission 120, which operating map specifies the maximum desired rod force F of the articulated rod 125 of the transmission 120 for each angle a of the drive shaft 115. The mechanical relationships between the transmission 120 and the wiper blade 170 are taken into consideration in the conversion of the operating map at the window 190 into the operating map of the transmission 120.

The resulting operating map 300 of the transmission 120 is illustrated in FIG. 3. The hatched region of the operating map 300 specifies permissible values of the rod force F of the articulated rod 125 of the transmission 120 for each angle a of the drive shaft 115. The permissible value ranges of the operating map 300 are limited by a first limit curve 310 and by a second limit curve 320. The positive values of the permissible rod force F, which values are limited by the first limit curve 310, can occur during a movement of the wiper blade 170 in a first direction, and the negative values of the permissible rod force F, which values are limited by the second limit curve 320, can occur during movement of the wiper blade 170 in a second direction.

Different torques output by the driving means 110 are required for different angles a of the drive shaft 115 in order to produce the permissible values of the rod force F on the first limit curve 310 because of the angular dependency of the transmission ratio of the transmission 120 and the angle-dependent elasticity of the transmission 120. The respectively required torque of the driving means 110 can be determined for each angle a of the drive shaft 115 from the intersecting point of the first limit curve 310 with one of the rod force profiles 210, 220, 230, 240, 250, 260, 270, 280. This applies correspondingly for the second limit curve 220. Therefore, in a third step, a permissible maximum positive and negative torque of the driving means 110 can be determined for each angle a of the drive shaft 115 from the intersecting points of the limit curves 310, 320 with the rod force profiles 210 to 280, as a result of which the operating map 140 of the driving means 110 can be obtained. The resultant operating map 140 of the driving means 110 specifies a maximum permissible positive and negative torque output by the driving means 110 for each angle a of the drive shaft 115. The control unit 130 uses the operating map 140 for controlling the driving means 110. This is explained below.

Figure 4:
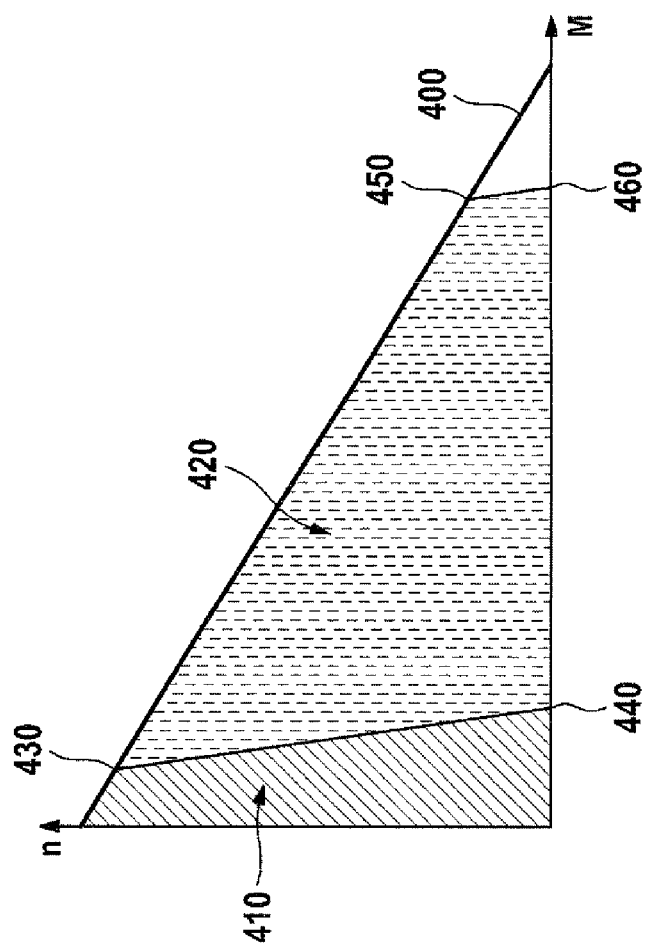
FIG. 4 shows a control characteristic of a driving means of the windshield wiper device.

FIG. 4 shows, in a schematic illustration, a graph in which a relationship between the torque M, which is plotted on the horizontal axis and is output by the driving means 110, and the rotational speed n of the driving means 110, the rotational speed being plotted on the vertical axis, is shown. There is an indirectly proportional, linear relationship between the two variables, said relationship being determined by the construction of the driving means 110 and being illustrated by a characteristic curve 400. In the unloaded state, the driving means 110 runs with a maximum rotational speed n which corresponds to the intersecting point of the characteristic curve 400 with the vertical axis of the graph in FIG. 4. In the event of a blockage, the driving means no longer outputs any rotational movement at all, but exerts a maximum torque M which corresponds to the intersecting point of the characteristic curve 400 with the horizontal axis.

The position of the characteristic curve 400 in the diagram in FIG. 4 is ascertained by the pulse-duty factor of the pulse-width-modulated voltage signal with which the control unit 130 activates the driving means 110. A variation in the pulse-duty factor leads to a parallel displacement of the characteristic curve 400, in which the gradient of the characteristic curve 400 remains unchanged.

The control unit 130 attempts to adjust the pulse-duty factor of the pulse-width-modulated voltage signal in such a manner that the actual rotational speed of the driving means 110, which rotational speed is determined with the aid of the tachometer 150, corresponds to a predetermined desired rotational speed. In this case, the predetermined desired rotational speed may be constant or dependent on the angle a of the drive shaft 115. In the latter case, the control unit 130 can deduce the desired rotational speed from the operating map 140.

From the pulse-duty factor located by the control circuit, the determined rotational speed of the driving means 110 and from knowledge of the characteristic curve 400 of the driving means 110, the control unit 130 can ascertain the torque actually output by the driving means 110. The control unit 130 compares said actual torque with the permissible torque range, which is defined by the operating map 140, for the current angle a of the drive shaft 115. If the control unit 130 determines that the permissible range has been exceeded, it takes suitable measures.

If the maximum torque which is defined in the operating map 140 and output by the driving means 110 corresponds, for example, to the second point 440 in the diagram in FIG. 4, all of the operating points within the first operating region 410 are permissible. If the operating point of the driving means 110 reaches the rotational speed n and the torque M, which rotational speed and torque correspond to the first point 430 in FIG. 4, the torque M output by the driving means 110 is first of all limited by a reduction in the rotational speed n. This can be understood in visual terms as meaning that the characteristic curve of the driving means 110 is bent at the first point 430 and is limited by a straight line to the permissible torque M at the second point 440. In this case, the torque associated with the first point 430 can likewise be stored in the operating map 140 or can be calculated from the maximum torque which is stored in the operating map 140 and which corresponds to the second point 440.

If the permissible torque M output by the driving means 110 corresponds to the value at the fourth point 460, then all of the operating points in a second operating region 420 are corresponding permissible. In this case, the characteristic curve is bent upon reaching a third point 450 and is limited by a straight line to the torque of the fourth point 460.

This method ensures that the torque M output by the driving means 110 does not permanently exceed the values stored in the operating map 140 for any angle a of the drive shaft 110. As a result, an excessive loading of the transmission 120, the wiper arm 160, the wiper blade 170 and other components of the windshield wiper device 100 can be prevented. As a consequence, the components of the windshield wiper device 100 can be formed with fewer mechanical reserves, thus giving rise to a lower weight, a smaller space requirement and lower production costs.

In the event of a blockage of the wiper blade 170, for example due to a wedge of snow on the window 190 or due to the wiper blade 170 freezing up on the window 190, the control unit 130 does not manage to adjust the pulse-duty factor of the pulse-width-modulated voltage signal in such a manner that the desired rotational speed n of the driving means 110 is set and the torque M output by the driving means 110 does not exceed the value stored in the operating map 140. In this case, the control unit 130 can react in a previously determined manner. For example, the control unit 130 can switch the driving means 110 off. As an alternative, the control unit 130 can reverse the direction of rotation of the driving means 110. The control unit 130 can also carry out a further attempt to move the wiper blade 170 beyond the critical region by means of the driving means 110.

If the windshield wiper device 100 has two wiper arms, it is possible, if the permissible operating region 410, 420 is left, to determine, on the basis of the angle-dependent elasticity of the transmission 120, which of the wiper arms is blocked.

Instead of or in addition to the maximum permissible torques of the driving means 110, which torques are stored in the operating map 140, maximum permissible torque gradients over time can also be provided. The maximum permissible torque gradients can likewise depend on the angular position of the driving means 110 or of the drive shaft 115. In this case, the control unit determines a torque gradient from the current and preceding torques output by the driving means 110 and monitors that said torque gradient does not exceed the value stored in the operating map 140.

The invention claimed is:

1. A windshield wiper device (100) with a driving means (110) and a control unit (130) for the driving means (110), characterized in that an operating map (140) is provided, in which a maximum torque to be output by the driving means (110) and a minimum rotational speed of the driving means (110) are stored; wherein the maximum torque is determined by an intersection of a rod force profile with a limit curve of the operating map (140).

2. The windshield wiper device (100) as claimed in claim 1, characterized in that a maximum torque to be output by the driving means (110) and a minimum rotational speed of the driving means (110) are in each case stored in the operating map (140) for different angular positions of a shaft (115) of the driving means (110).

3. The windshield wiper device (100) as claimed in claim 2, characterized in that a further torque limit value is in each case additionally stored in the operating map (140) for different angular positions of a shaft (115) of the driving means (110).

4. The windshield wiper device (100) as claimed in claim 2, characterized in that a transmission (120) which transmits a movement of the driving means (110) to a wiper shaft (180) is arranged downstream of the driving means (110), the transmission (120) having a transmission ratio which depends on the angular position of the shaft (115) of the driving means (110).

5. The windshield wiper device (100) as claimed in claim 1, characterized in that the driving means (110) can be activated by a pulse-width-modulated voltage signal, and the control unit (130) is designed to regulate a pulse-duty factor of the pulse-width-modulated voltage signal in such a manner that a minimum rotational speed of the driving means (110) is set, which minimum rotational speed is stored in the operating map (140), and a torque output by the driving means (110) does not exceed a maximum torque stored in the operating map (140).

6. The windshield wiper device (100) as claimed in claim 5, characterized in that a device (150) is provided for ascertaining a rotational speed of the driving means (110), and the control unit (130) is designed to determine the torque output by the driving means (110) on the basis of the rotational speed of the driving means (110) and of the pulse-duty factor of the pulse-width-modulated voltage signal.

7. The windshield wiper device (100) as claimed in claim 6, characterized in that the control unit (130) is designed to switch the driving means (110) off or to reverse a driving direction of the driving means (110) if the torque output by the driving means (110) exceeds the maximum torque provided in the operating map (140).

8. A method for operating a windshield wiper device (100), with a driving means (110) and a control unit (130) for the driving means (110), characterized by the following method steps:
    determining a maximum torque to be output by the driving means (110);
    determining a desired rotational speed of the driving means (110);
    regulating a pulse-duty factor of a pulse-width-modulated voltage signal for activating the driving means (110) in such a manner that the desired rotational speed of the driving means (110) is set and an actual torque output by the driving means (110) does not exceed the maximum torque;
    wherein the maximum torque is determined by an intersection of a rod force profile with a limit curve of an operating map (140).

9. The method as claimed in claim 8, characterized in that it is determined if the pulse-duty factor cannot be adjusted in such a manner that the desired rotational speed of the driving means (110) is set and the actual torque output by the driving means (110) does not exceed the maximum torque, the pulse-duty factor being adjusted in this case in such a manner that a lower rotational speed is set.

10. The method as claimed in claim 8, characterized in that the maximum torque output by the driving means (110) and the desired rotational speed of the driving means (110) are determined depending on an angular position of a shaft (115) of the driving means (110).

11. The method as claimed in claim 8, characterized in that the maximum torque output by the driving means (110) and by the desired rotational speed of the driving means (110) are deduced from an operating map (140).

12. The method as claimed in claim 8, characterized in that the maximum torque output by the driving means (110) is determined depending on an angular position of a shaft (115) of the driving means (110).

13. The method as claimed in claim 8, characterized in that the desired rotational speed of the driving means (110) is determined depending on an angular position of a shaft (115) of the driving means (110).

14. The method as claimed in claim 8, characterized in that the maximum torque output by the driving means (110) is deduced from an operating map (140).

15. The method as claimed in claim 8, characterized in that the desired rotational speed of the driving means (110) is deduced from an operating map (140).

\* \* \* \* \*